(12) United States Patent
Ko (10) Patent No.: US 10,364,891 B2
(45) Date of Patent: Jul. 30, 2019

(54) METHOD AND APPARATUS FOR MAKING HELICAL COIL SPRING TYPE SEAL

(71) Applicant: NEO MECHANICS LIMITED, Hong Kong (HK)

(72) Inventor: Stanley Moon Kai Ko, Hong Kong (HK)

(73) Assignee: NEO MECHANICS LIMITED, Hong Kong (HK)

(*) Notice: Subject to any disclaimer, the term of this patent is extended or adjusted under 35 U.S.C. 154(b) by 144 days.

(21) Appl. No.: 15/329,579

(22) PCT Filed: Jul. 27, 2015

(86) PCT No.: PCT/CN2015/085206
§ 371 (c)(1),
(2) Date: Jan. 27, 2017

(87) PCT Pub. No.: WO2016/015611
PCT Pub. Date: Feb. 4, 2016

(65) Prior Publication Data
US 2018/0209544 A1    Jul. 26, 2018

Related U.S. Application Data

(60) Provisional application No. 62/029,577, filed on Jul. 28, 2014.

(51) Int. Cl.
*F16F 1/02* (2006.01)
*F16F 1/06* (2006.01)
*B23K 37/04* (2006.01)
*F16J 15/08* (2006.01)

(52) U.S. Cl.
CPC ....... *F16J 15/0893* (2013.01); *B23K 37/0426* (2013.01); *F16F 1/06* (2013.01); *F16J 15/0887* (2013.01); *F16F 1/025* (2013.01); *F16F 2226/04* (2013.01); *F16F 2226/048* (2013.01)

(58) Field of Classification Search
CPC .............. F16F 2226/00; F16F 2226/04; F16F 2226/042; F16F 2226/044–048; F16F 1/025; F16F 1/042
USPC ....................................................... 277/417
See application file for complete search history.

(56) References Cited

U.S. PATENT DOCUMENTS

| 274,715 | A * | 3/1883 | Buckley ................. B29C 45/44 267/180 |
| 3,945,649 | A * | 3/1976 | Nakamura ............... F16J 15/20 277/417 |
| 2011/0169205 | A1* | 7/2011 | Kempf .................... B29C 45/44 267/180 |

* cited by examiner

*Primary Examiner* — David P Bryant
*Assistant Examiner* — Nirvana Deonauth
(74) *Attorney, Agent, or Firm* — Idea Intellectual Limited; Margaret A. Burke; Sam T. Yip (57) ABSTRACT

The present invention relates to a method for fabricating a helical coil spring type seal. The method of the present invention is able to make the stacked layers of ring sharing the same center point during the making of the helical coil spring type seal.

7 Claims, 12 Drawing Sheets

METHOD AND APPARATUS FOR MAKING HELICAL COIL SPRING TYPE SEAL

CLAIM FOR PRIORITY

This application claims priority under the Paris Convention to the U.S. Provisional Patent Application No. 62/029,577 filed Jul. 28, 2014, the disclosure of which is incorporated herein by reference in its entirety.

FIELD OF THE INVENTION

The present invention relates generally to apparatuses and methods of making a helical coil spring type seal.

BACKGROUND OF THE INVENTION

Figure 1A:
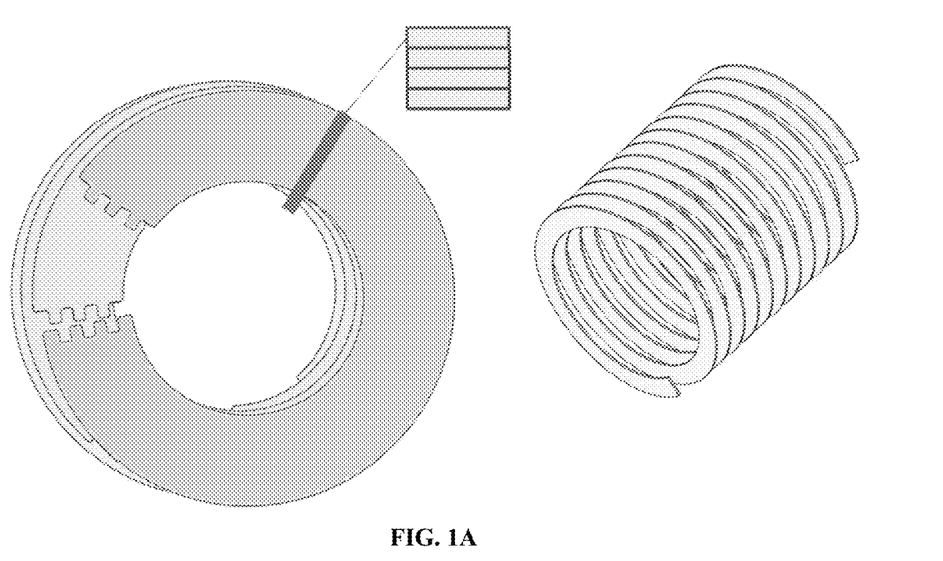
FIG. 1A depicts a diagram showing a coiled felt seal made by welding individual C-shaped rings together to form a coiled structure in a prior art.

Referring to FIG. 1A. A helical coil spring type seal is made by welding individual C-shaped rings together to form a coiled structure. The flat surface of each ring is placed in close contact with the flat surface of the adjacent ring. In one embodiment, the C-shaped rings are cut from metal sheet, welded and stacked together to form the layers in a helical coil structure. This will make sure that the cross section of each layer is always in rectangle shape. The flat surfaces of the layers will be in full contact with each other to prevent leaks between the layers and enable the sealing function. The layers of coil are then grinded to have different diameters corresponding to the different sealing surfaces.

Figure 1B:
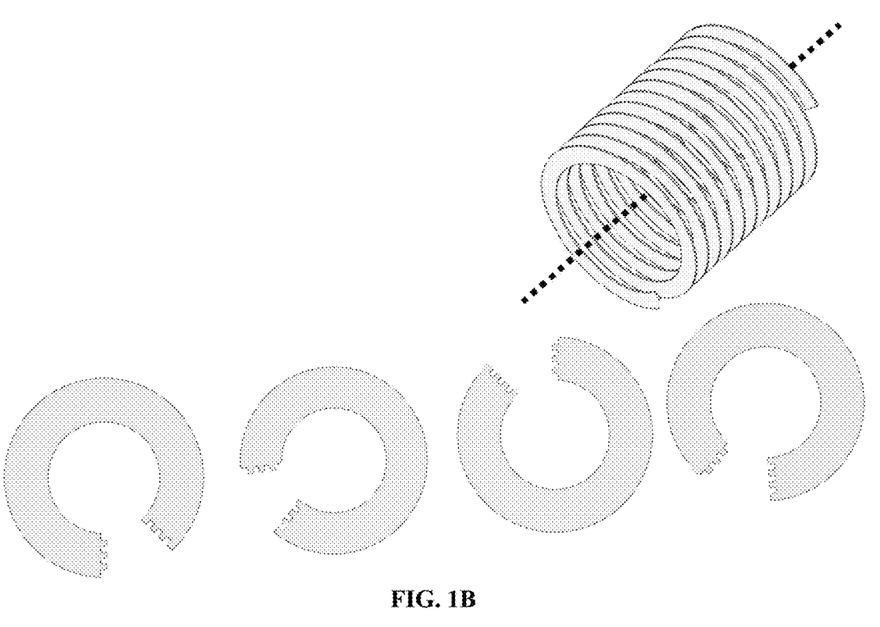
FIG. 1B depicts a diagram showing a coiled felt seal needed to have the stacked layers of ring sharing the same center point in a prior art.

However, referring to FIG. 1B, when a coil structure is made by welding the C-rings together, in many cases, it is essential that all the layers are sharing the same center when all the C-rings have been welded separately, especially when they have different diameters that some of them seal the shaft surface, some of them seal the cylinder surface, and some of them neither be in contact with the shaft nor the cylinder.

One difficulty arises during the making of a helical coil spring type seal is to make the stacked layers of ring sharing the same center point when each layer is made from welding the C-shaped rings together end to end and one by one individually. The difficulty escalates when the stacked layers of ring are to be made having different diameters.

Consequently, there is an unmet need to have a method and/or apparatus for fabricating a helical coil spring type seal, in which all the C-shaped rings that have welded together share the same center lying on the same center line.

SUMMARY OF THE INVENTION

A first aspect of the present invention is to provide a method for fabricating a helical coil spring type seal.

In accordance with a first embodiment of the present invention, a method for fabricating a helical coil spring type seal comprising: determining an inner diameter and an outer diameter of one or more absorption layers, wherein the inner diameter of the absorption layers is larger than a diameter of a piston and the outer diameter of the absorption layers is smaller than a diameter of a cylinder internal wall; determining an inner diameter and an outer diameter of one or more cylinder-sealing layers, wherein the outer diameter of the cylinder-sealing layers is larger than the diameter of the cylinder internal wall; determining an inner diameter and an outer diameter of piston-sealing layers, wherein the inner diameter of the piston-sealing layers is smaller than the diameter of the piston; providing a coiled structure of C-shaped rings of same inner and outer diameters each head-to-tail joined to one another and stacked together; grinding the internal wall of a first portion of the coiled structure, which consists of the cylinder-sealing and absorption layers C-shaped rings, and grinding the external wall of a second portion of the coiled structure, which consists of the piston-sealing and absorption layers C-shaped rings, to form the helical coil spring type seal having the determined inner diameter and the determined outer diameter of the cylinder-sealing layers, the determined inner diameter and the determined outer diameter of the absorption layers, and the determined inner diameter and the determined outer diameter of the piston-sealing layers.

In accordance with a second embodiment of the present invention, a method for fabricating a helical coil spring type seal comprising: determining an inner diameter and an outer diameter of one or more absorption layers, wherein the inner diameter of the absorption layers is larger than a diameter of a piston and the outer diameter of the absorption layers is smaller than a diameter of a cylinder internal wall; determining an inner diameter and an outer diameter of one or more cylinder-sealing layers, wherein the outer diameter of the cylinder-sealing layers is larger than the diameter of the cylinder internal wall; determining an inner diameter and an outer diameter of piston-sealing layers, wherein the inner diameter of the piston-sealing layers is smaller than the diameter of the piston; providing a coiled structure consisting of cylinder-sealing layer C-shaped rings, followed by absorption layer C-shaped rings, and followed by piston-sealing C-shaped rings of inner and outer diameters of the determined inner and outer diameters of the cylinder-sealing layers, absorption layers, and piston-sealing layers respectively, with each C-shaped ring is head-to-tail joined to one another and stacked together.

For either embodiment, the C-shaped rings can be produced from sheet metal stamping and/or cutting, or three-dimensional (3D) printing techniques.

A second aspect of the present invention is to provide a helical coil spring type seal fabricated by the method of the present invention for sealing a reciprocating piston-cylinder assembly.

Accordingly, during the making of a helical coil spring type seal, the method of the present invention is able to make the stacked layers of ring sharing the same center point when each layer is made from welding the C-shaped rings together one by one individually.

BRIEF DESCRIPTION OF THE DRAWINGS

Embodiments of the present invention are described in more detail hereinafter with reference to the drawings, in which.

DETAILED DESCRIPTION OF PREFERRED EMBODIMENTS

In the following description, apparatuses and methods of making helical coil spring type seal are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 2A:
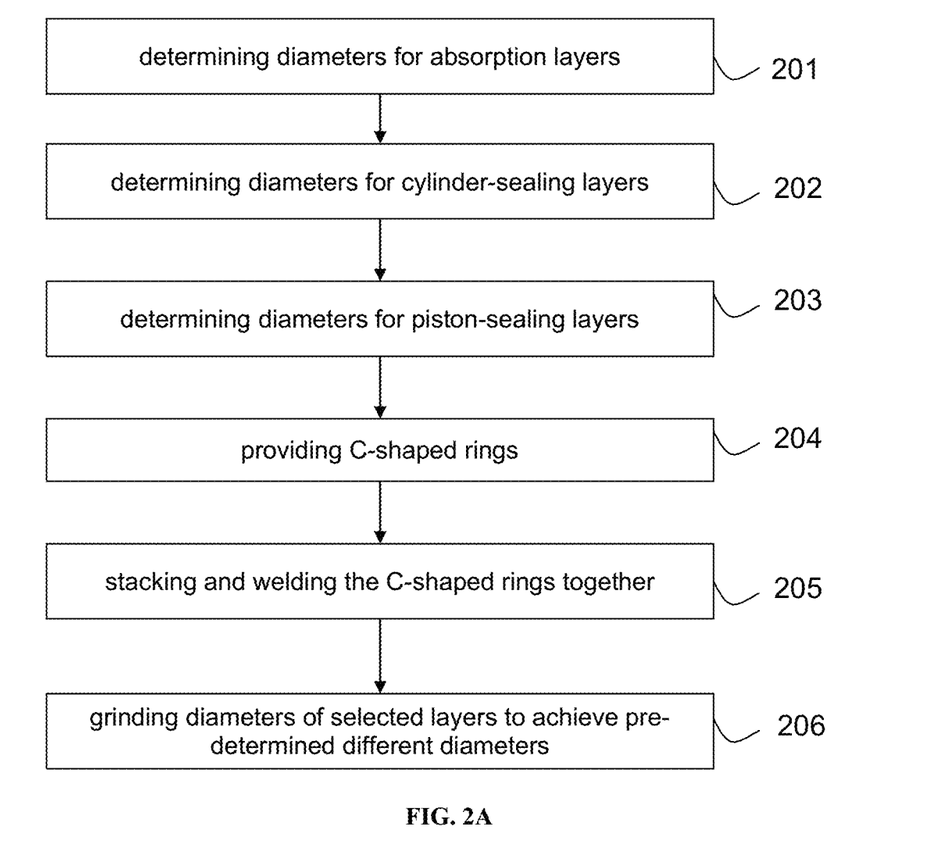
FIG. 2A depicts a flow chart showing the steps of a method for fabricating a helical coil spring type seal for sealing a reciprocating piston-cylinder assembly according to an embodiment of the present invention.

FIG. 2A is a flow chart showing the steps of a method for fabricating a helical coil spring type seal for sealing a reciprocating piston-cylinder assembly according to an embodiment of the present invention. The helical coil spring type seal comprises piston-sealing layers, absorption layers, and cylinder-sealing layers. The reciprocating piston-cylinder assembly comprises a piston and a cylinder internal wall.

In step 201, the diameters for absorption layers are determined. The inner diameter of the absorption layers is larger than the diameter of the piston and the outer diameter of the absorption layers is smaller than the diameter of the cylinder internal wall. In step 202, the diameters for cylinder-sealing layers are determined. The inner diameter of the cylinder-sealing layers is set to be larger than the diameter of the piston. Preferably, the inner diameter of the cylinder-sealing layers can be the same as the inner diameter of the absorption layers. The outer diameter of the cylinder-sealing layers is set to be slightly larger than the diameter of the cylinder internal wall. Preferably, the external wall of the portion of the helical coil spring type seal consisting of the cylinder-sealing layers is highly polished (i.e. mechanically) for better sealing effect. In step 203, the diameters for piston-sealing layers are determined. The outer diameter of the piston-sealing layers is smaller than the diameter of the cylinder internal wall. Preferably, the outer diameter of the piston-sealing layers can be the same as the outer diameter of the absorption layers. The inner diameter of the piston-sealing layers is set to be slightly smaller than the diameter of the piston. Preferably, the internal wall of the portion of the helical coil spring type seal consisting of the piston-sealing layers is highly polished (i.e. mechanically) for better sealing effect. In step 204, C-shaped rings are provided. In an exemplary embodiment, the C-shaped rings are produced from sheet metal stamping and/or cutting, or 3D printing techniques. In step 205, the C-shaped rings are placed on a welding holder to be stacked and welded for connecting with each other together to form a coiled structure. In step 206, the coiled structure is grinded away part of the coiled structure to achieve the pre-determined different diameters of the piston-sealing layers, absorption layers, and cylinder-sealing layers.

Figure 2B:
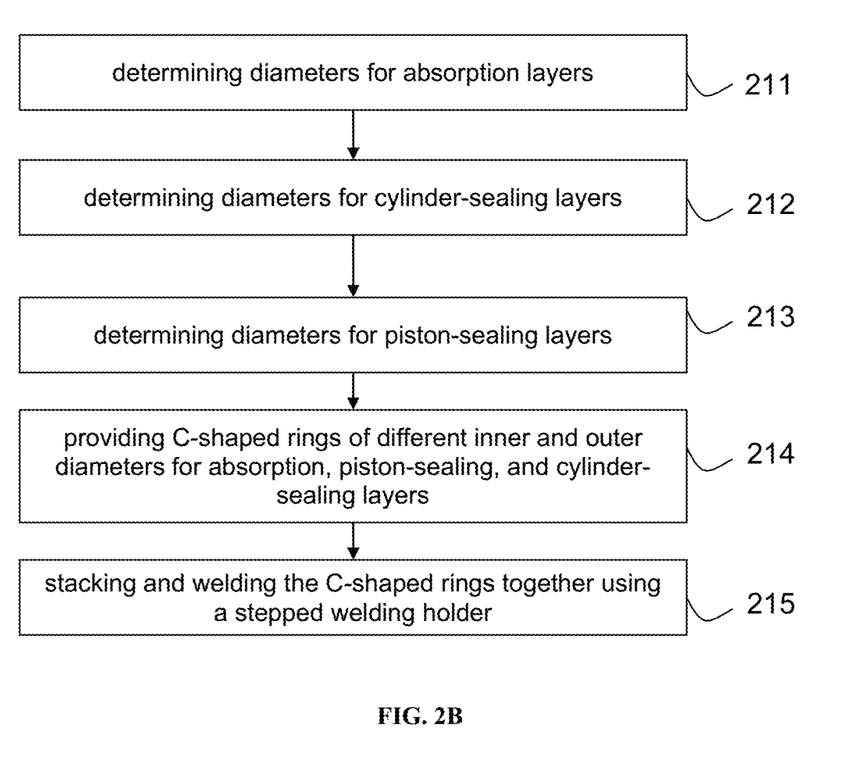
FIG. 2B depicts a flow chart showing the steps of a method for fabricating a helical coil spring type seal for sealing a reciprocating piston-cylinder assembly according to an alternative embodiment of the present invention.

FIG. 2B is a flow chart showing the steps of a method for fabricating a helical coil spring type seal for sealing a reciprocating piston-cylinder assembly according to an alternative embodiment of the present invention.

Steps 211-213 are same as steps 201-203. In step 214, C-shaped rings of different inner and outer diameters according to the diameter specifications of the absorption layers, piston-sealing layers, and cylinder-sealing layers are provided. In step 215, using a stepped welding holder, such as that shown in FIG. 5, the C-shaped rings are placed one-by-one on the welding holder to be stacked and welded for connecting with each other together to form a coiled structure. First, the cylinder-sealing layer C-shaped rings are to be stacked and welded first, followed by the absorption layer C-shaped rings, and lastly the piston-sealing layer C-shaped rings.

Figure 3A:
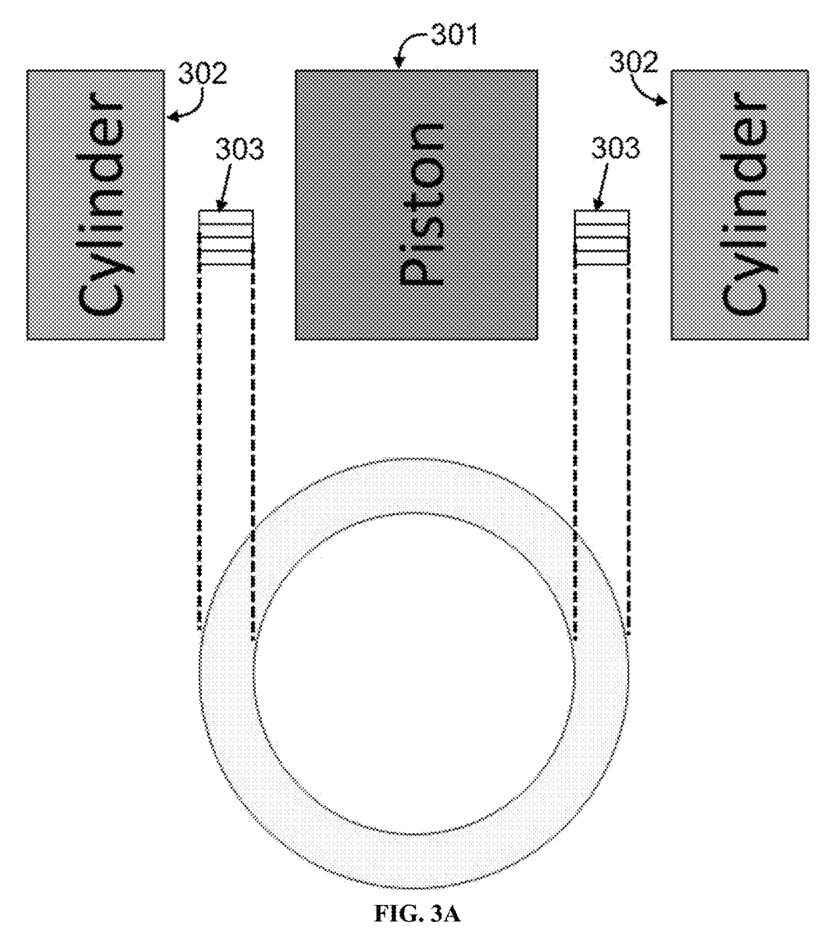
FIG. 3A depicts a schematic diagram showing the step of determining the diameters for the absorption layers according to an embodiment of the present invention.
Figure 3B:
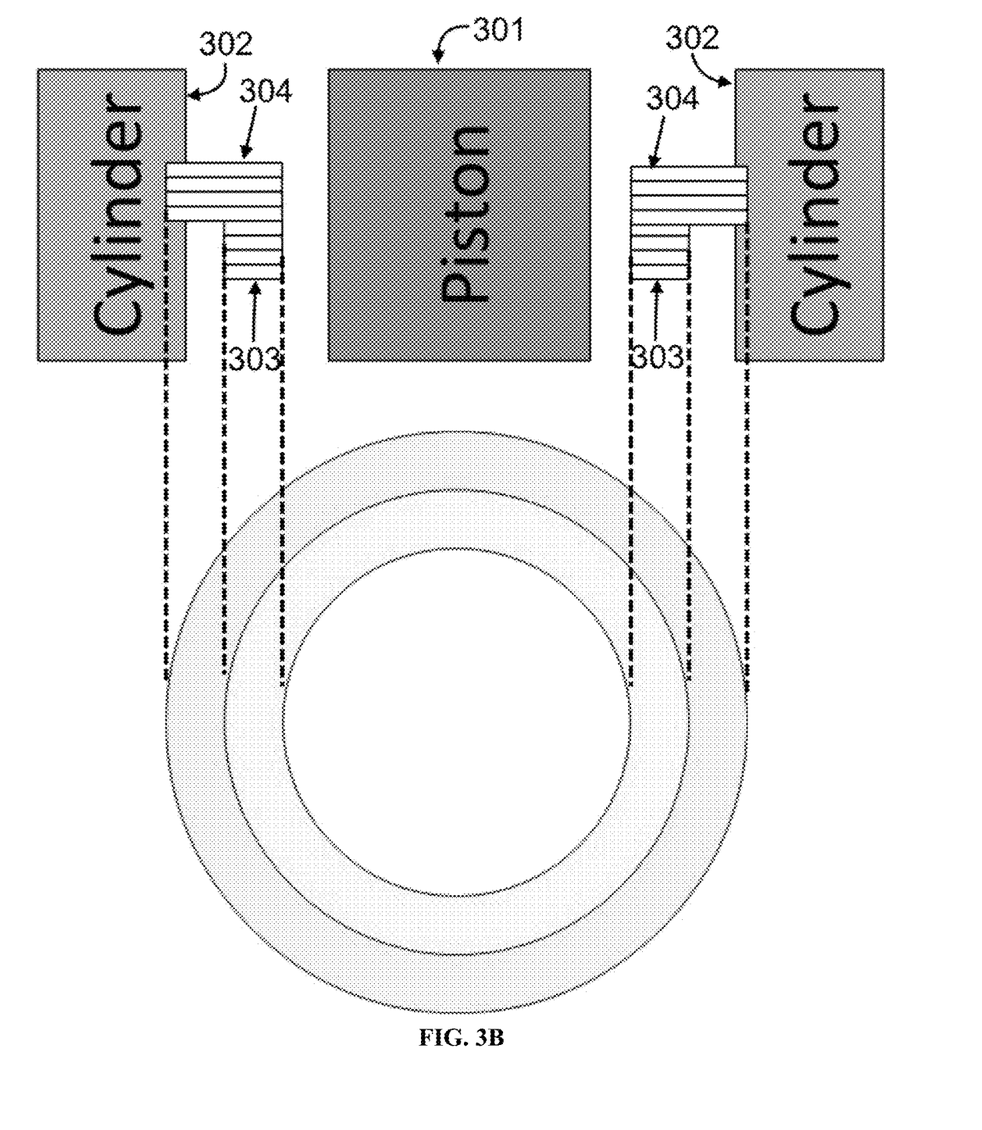
FIG. 3B depicts a schematic diagram showing the step of determining the diameters for the cylinder-sealing layers according to an embodiment of the present invention.
Figure 3C:
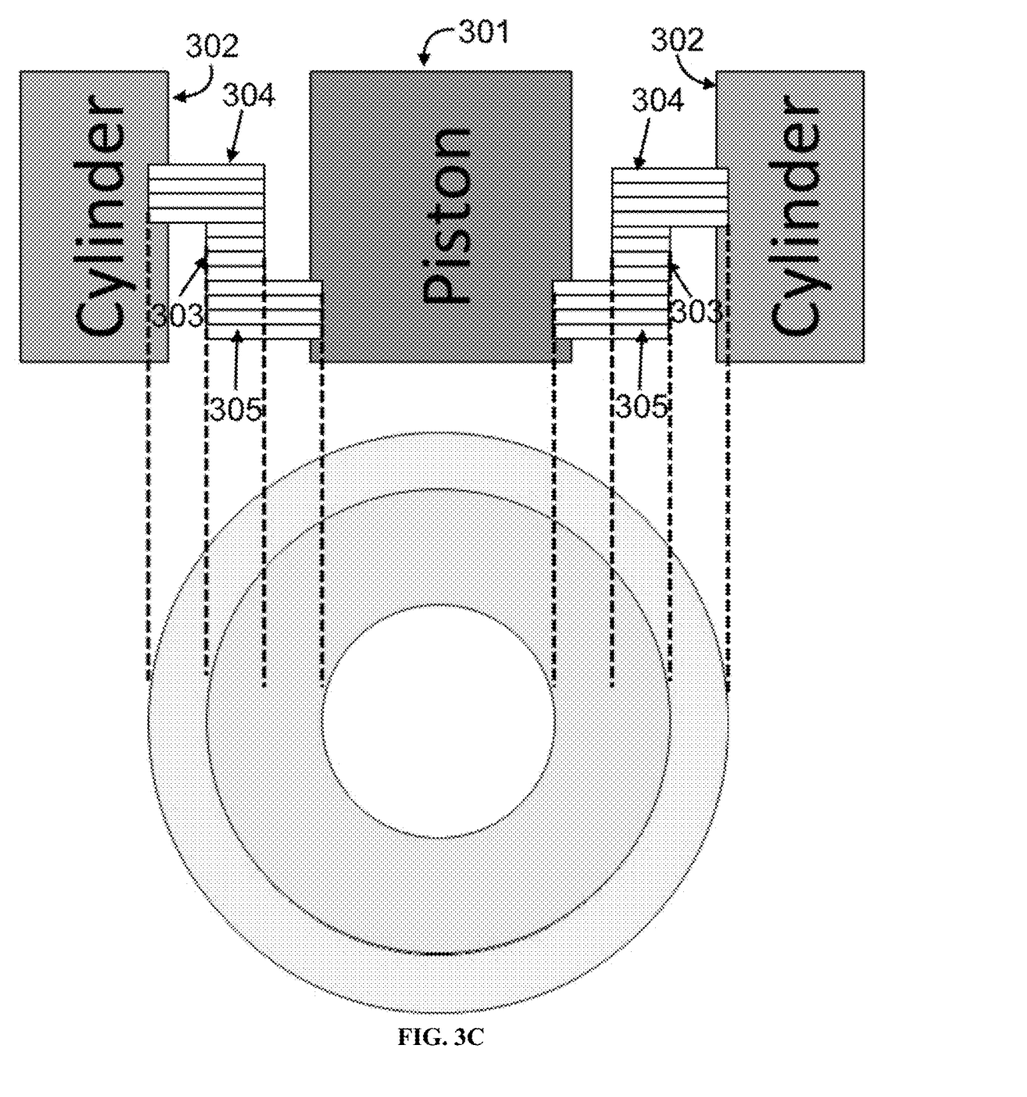
FIG. 3C depicts a schematic diagram showing the step of determining the diameters for the piston-sealing layers according to an embodiment of the present invention.

Referring to FIGS. 3A-3C. To illustrate the present invention, the making of a helical coil spring type seal for sealing a reciprocating piston-cylinder assembly is presented in the following. One embodiment of such helical coil spring type seal generally comprises at least three groups of layer: piston-sealing layers, absorption layers, and cylinder-sealing layers.

First, determines the diameters for the absorption layers 303 as shown in FIG. 3A. The absorption layers 303 touch neither the wall of a piston 301 nor the cylinder internal wall 302, thus the inner diameter of the absorption layers 303 is larger than the diameter of the piston 301 and the outer diameter of the absorption layers 303 is smaller than the diameter of the cylinder internal wall 302.

Secondly, determines the diameters for the cylinder-sealing layers 304 as shown in FIG. 3B. The inner diameter of the cylinder-sealing layers 304 can be the same as the inner diameter of the absorption layers 303. The outer diameter of the cylinder-sealing layers 304 is set to be slightly larger than the diameter of the cylinder internal wall 302.

Thirdly, determines the diameters for the piston-sealing layers 305 as shown in FIG. 3C. The outer diameter of the piston-sealing layers 305 can be the same as the outer diameter of the absorption layers 303. The inner diameter of the piston-sealing layers 305 is set to be slightly smaller than the diameter of the piston 301.

Figure 4:
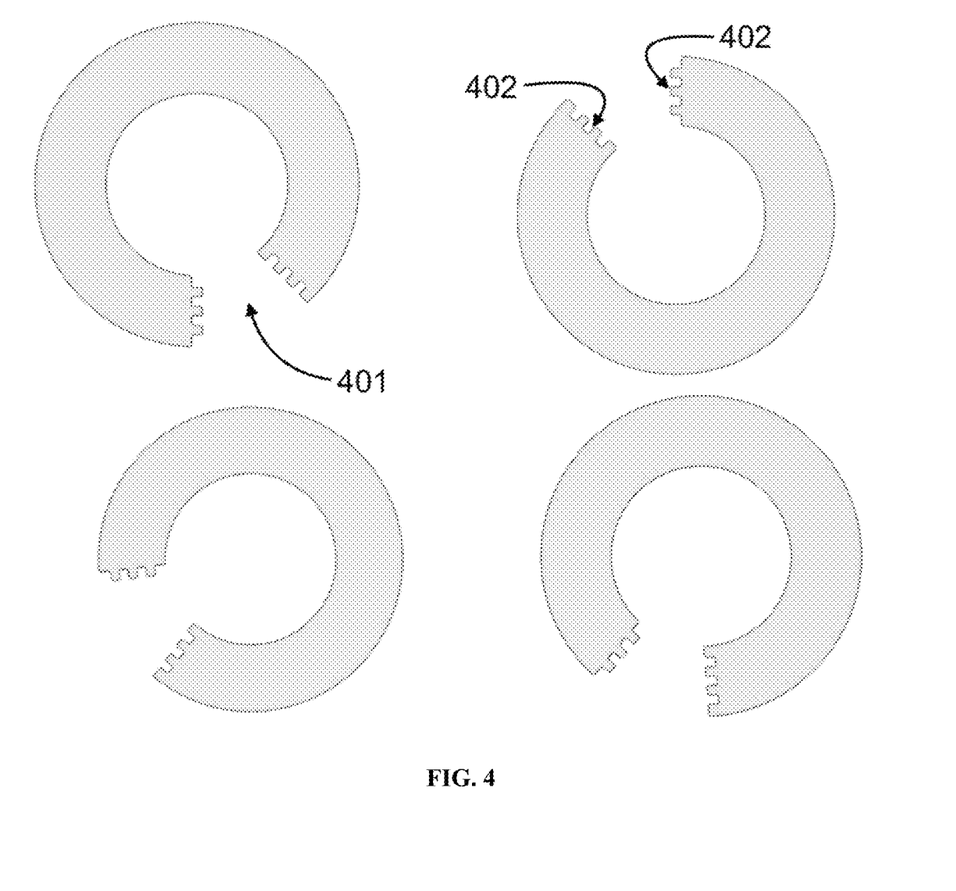
FIG. 4 depicts a diagram showing C-shaped rings having a 45 degree gap with dove-tail connections according to an embodiment of the present invention.

Referring to FIG. 4. In one embodiment, each of the C-shaped rings is designed to have a sector gap 401 with dove-tail connections 402 at both opening ends of the ring. The sector gap 401 and the dove-tail connections 402 allow two C-shaped rings to connect end-to-end to form a coil. Typically a 45 degree opening of the sector gap 401 is used to facilitate automatic machine welding as the C-shaped rings are placed one-by-one on a rotatable welding holder to be rotated to the welding position to be welded. Other sector gap angles of opening are also possible.

Figure 5:
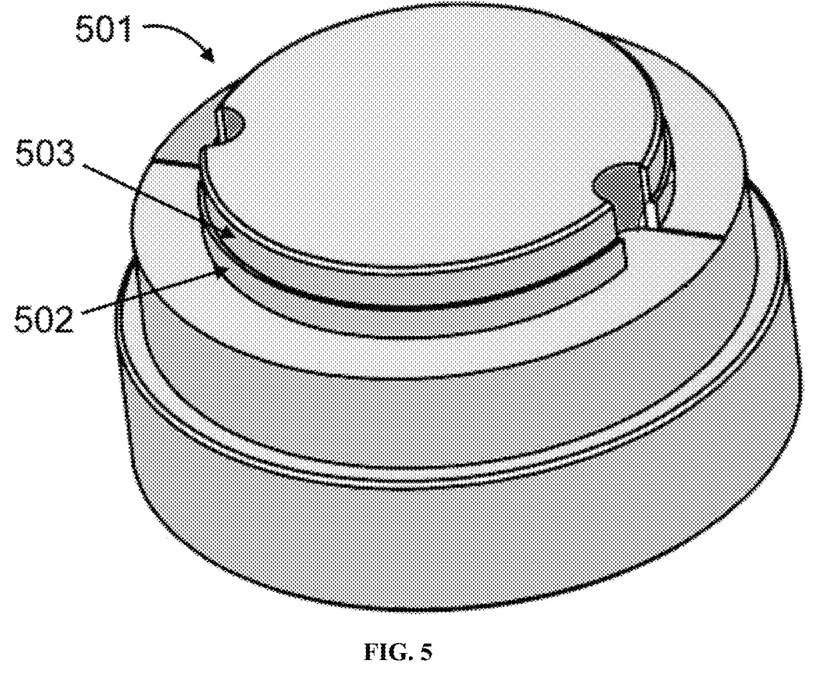
FIG. 5 depicts a diagram showing a welding holder for welding C-shaped rings together according to an embodiment of the present invention.

Referring to FIG. 5. In accordance to one aspect of the present invention, a stepped welding holder 501 is provided for welding the C-shaped rings together. The stepped welding holder 501 is designed specifically for making a helical coil spring type seal with multi-layer with different inner and outer diameters for each layer of coils. In this exemplary embodiment, the stepped welding holder 501 is used for making a helical coil spring type seal with piston-sealing layers, absorption layers, and cylinder-sealing layers. The stepped welding holder 501 has it most outer diameter larger than that of entire seal so that its steps' upper surfaces will act as a holding platforms for the coils of the seal. The lower step 502 has diameter slightly smaller than the inner diameter of the cylinder-sealing layer and absorption layer C-shaped rings. It acts as a guider guiding the C-shaped rings of these two layers to wind along its diameter when being welded together, assuring the same center point is shared by the resulting coils. The upper step 503 has diameter slightly smaller than the inner diameter of the piston-sealing layer C-shaped rings and guide them to wind along its diameter when being welded together, assuring the same center point is shared by the resulting coils. Thus, the stepped welding holder 501 guides the C-shaped rings of different layers when being welded together to be form the concentric coils of the helical coil spring type seal.

During the welding process, C-shaped rings of the cylinder-sealing layers are first placed one-by-one on the stepped welding holder 501 and around the lower step 502 for welding. The welding of the cylinder-sealing layer C-shaped rings is followed by absorption layer C-shaped rings, again placed one-by-one on the stepped welding holder 501 and around the lower step 502 for welding. Lastly, C-shaped rings of the piston-sealing layers are placed one-by-one on the stepped welding holder 501 and around the upper step 503 for welding. To describe more clearly on the welding of the C-shaped rings, a first C-shaped ring is placed on the stepped welding holder 501, then a second C-shaped ring is placed on top of the first C-shaped ring and be dove-tail connected together. With the connected first and second C-shaped rings secured on the welding holder, the stepped welding holder 501 rotates to align the dove-tail connection with the welder for welding. Subsequently, a third C-shaped ring is placed on top of the welded first and second C-shaped rings and be dove-tail connected to the second C-shaped ring at its unconnected end. The stepped welding holder 501 again rotates to align the dove-tail connection of the third and second C-shaped rings with the welder for welding. The aforementioned steps repeat to form the coiled structure with the needed layers of rings. This way, the same center for the entire coiled structure is assured.

Figure 6:
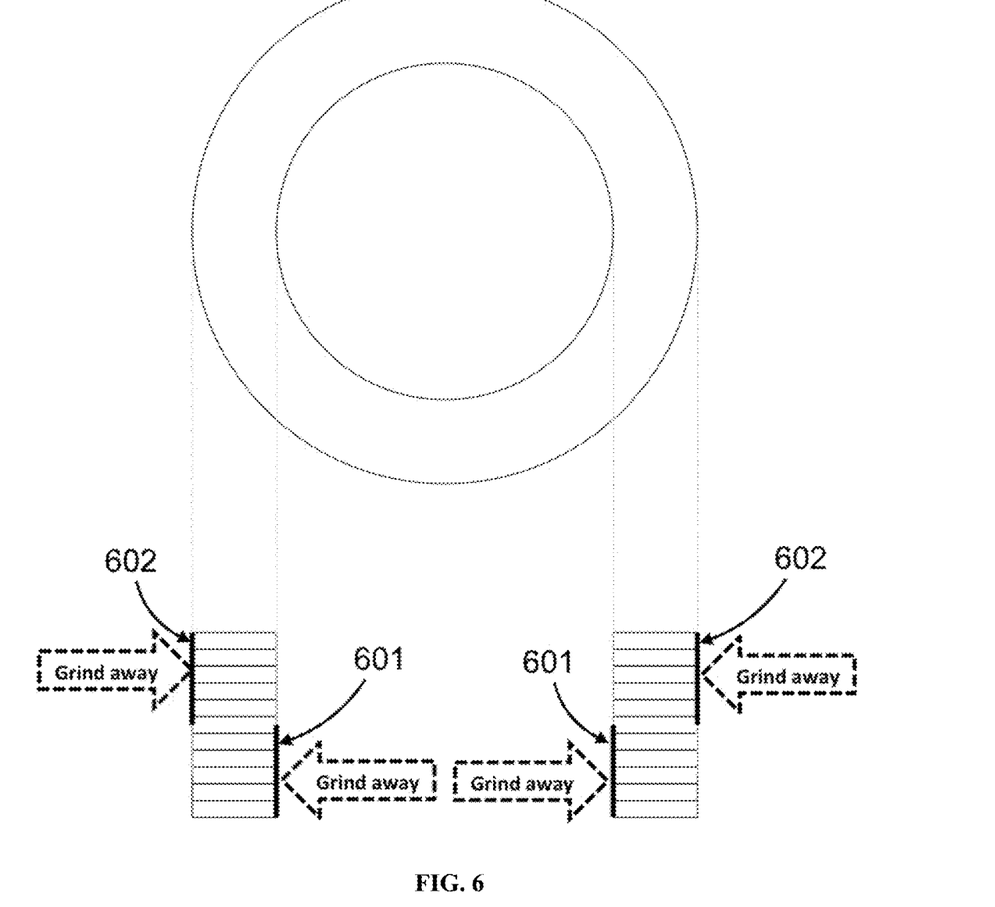
FIG. 6 depicts a schematic diagram showing a helical coil spring type seal according to an embodiment of the present invention.

In accordance to another embodiment, C-shaped rings of same inner and outer diameters are welded together to form a coiled structure in substantially the same method as described above but with a welding holder of only a single step of one diameter in guiding the C-shaped rings during welding. Then, referring to FIG. 6, mechanical grinding of the internal wall of a first portion 601 of the coiled structure, which consists of the cylinder-sealing and absorption layers C-shaped rings, and grinding of the external wall of a second portion 602 of the coiled structure, which consists of the piston-sealing and absorption layers C-shaped rings, is employed to form the helical coil spring type seal having the pre-determined inner diameter and the pre-determined outer diameter of the cylinder-sealing layers, the pre-determined inner diameter and the pre-determined outer diameter of the absorption layers, and the pre-determined inner diameter and the pre-determined outer diameter of the piston-sealing layers.

Figure 7A:
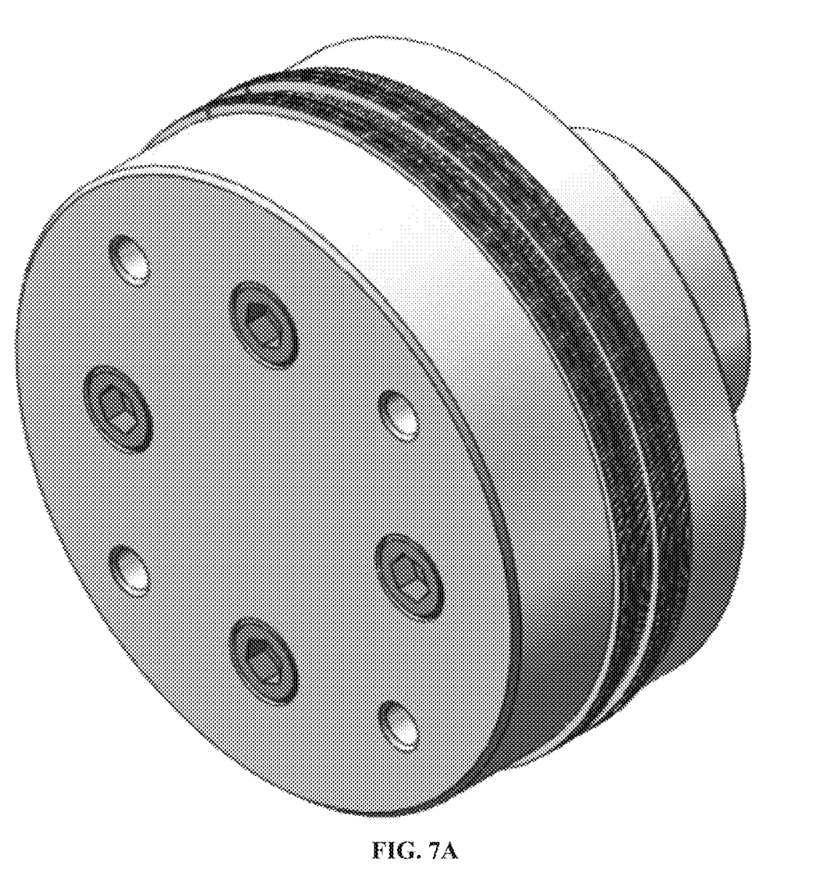
FIG. 7A depicts a diagram of an external grinding jig according to an embodiment of the present invention.
Figure 7B:
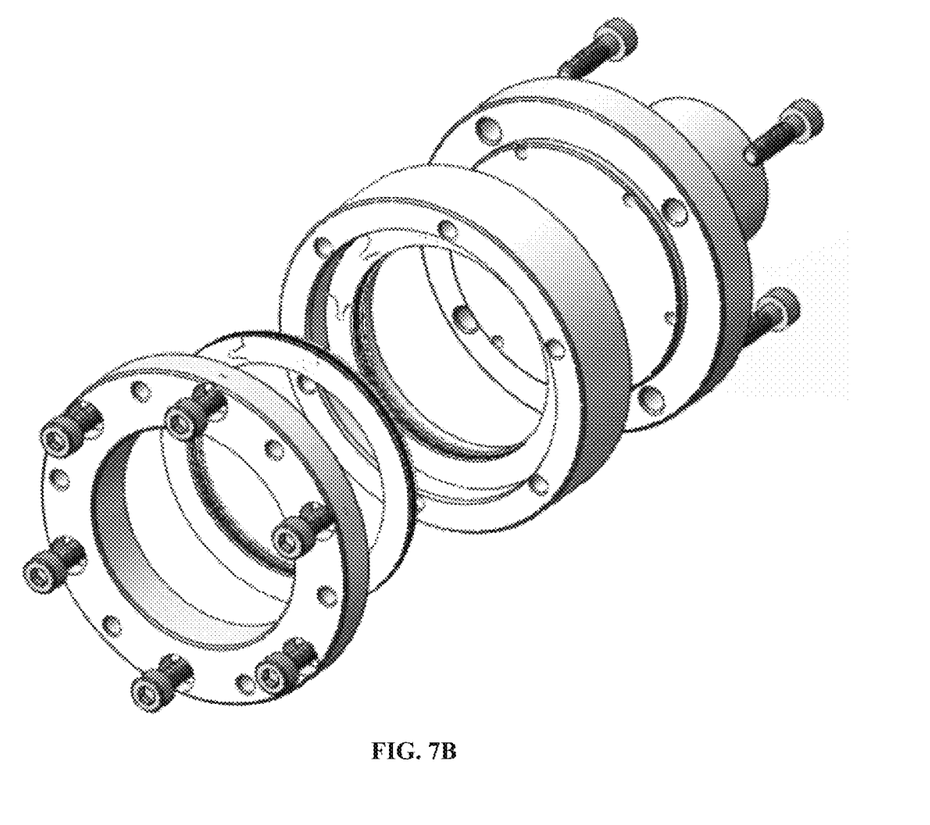
FIG. 7B depicts a diagram of internal grinding jig according to an embodiment of the present invention.

FIG. 7A depicts a diagram of an external grinding jig suitable for the grinding operation. The external grinding jig is used for precisely grinding the cylinder-sealing layer C-shaped rings of the coiled structure to obtain the determined outer diameter of the cylinder-sealing layers. FIG. 7B depicts a diagram of an internal grinding jig suitable for the grinding operation. The internal grinding jig is used for precisely grinding the piston-sealing layer C-shaped rings of the coiled structure to obtain the determined outer diameter of the piston-sealing layers.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for fabricating a seal with a helical coil spring structure, comprising: determining an inner diameter and an outer diameter of one or more absorption layers, wherein the inner diameter of the absorption layers is larger than a diameter of a piston and the outer diameter of the absorption layers is smaller than a diameter of a cylinder internal wall; determining an inner diameter and an outer diameter of one or more cylinder-sealing layers, wherein the inner diameter of the cylinder-sealing layers is the same as the inner diameter of the absorption layers and the outer diameter of the cylinder-sealing layers is larger than the diameter of the cylinder internal wall; determining an inner diameter and an outer diameter of piston-sealing layers, wherein the inner diameter of the piston-sealing layers is smaller than the diameter of the piston and the outer diameter of the piston-sealing layers is the same as the outer diameter of the absorption layers; providing a plurality of C-shaped rings, comprising: one or more absorption layer C-shaped rings of the determined inner and outer diameters of the absorption layers; one or more cylinder-sealing layer C-shaped rings of the determined inner and outer diameters of the cylinder-sealing layers; and one or more piston-sealing layer C-shaped rings of the determined inner and outer diameters of the piston-sealing layers; stacking and connecting the plurality of C-shaped rings together to form a coiled structure of the seal, wherein the step of stacking and connecting the plurality of C-shaped rings together to form a coiled structure comprises: placing the C-shaped rings one-by-one on a rotatable stepped welding holder to be connected and welded to each other to form the coiled structure.

2. The method of claim 1, wherein each of the C-shaped rings has an approximately 45 degree opening sector gap with dove-tail connections one at each end of each of the C-shaped rings.

3. The method of claim 2, wherein the step of stacking and connecting the plurality of C-shaped rings together to form a coiled structure further comprises: placing a first C-shaped ring on to the stepped welding holder; placing a second C-shaped ring on top of the first C-shaped ring such that the first C-shaped ring and the second C-shaped ring are dove-tail connected; rotating the stepped welding holder to align the dove-tail connections between the first C-shaped ring and the second C-shaped ring with a welder for welding; placing a third C-shaped ring on top of the welded second C-shaped ring such that the welded second C-shaped ring and the third C-shaped ring are dove-tail connected; rotating the stepped welding holder to align the dove-tail connections between the welded second C-shaped ring and the third C-shaped ring with the welder for welding; and repeating the above steps with other C-shaped rings until formation of the coiled structure of C-shaped rings.

4. The method of claim 1, further comprises: precisely grinding an internal wall portion of the coiled structure of C-shaped rings of the seal by an internal grinding jig to obtain the determined inner diameter of the piston-sealing layers; and precisely grinding an external wall portion of the coiled structure of C-shaped rings of the seal by an external grinding jig to obtain the determined outer diameter of the cylinder-sealing layers.

5. The method of claim 1, wherein the step of stacking and connecting the plurality of C-shaped rings together to form a coiled structure comprises: placing the C-shaped rings one-by-one on the stepped rotatable welding holder to be connected and welded to each other to form the coiled structure.

6. The method of claim 5, wherein each of the C-shaped rings has an approximately 45 degree opening sector gap with dove-tail connections one at each end of each of the C-shaped rings.

7. The method of claim 6, wherein the step of stacking and connecting the plurality of C-shaped rings together to form a coiled structure further comprises:
    placing a first C-shaped ring on to the stepped welding holder;
    placing a second C-shaped ring on top of the first C-shaped ring such that the first C-shaped ring and the second C-shaped ring are dove-tail connected;
    rotating the stepped welding holder to align the dove-tail connections between the first C-shaped ring and the second C-shaped ring with a welder for welding;
    placing a third C-shaped ring on top of the welded second C-shaped ring such that the welded second C-shaped ring and the third C-shaped ring are dove-tail connected;
    rotating the stepped welding holder to align the dove-tail connections between the welded second C-shaped ring and the third C-shaped ring with the welder for welding; and
    repeating the above steps with other C-shaped rings until formation of the coiled structure of C-shaped rings;
    wherein C-shaped rings of the cylinder-sealing layers are first placed one-by-one on the stepped welding holder and around a bottom step of the stepped welding holder for welding, followed by C-shaped rings of the absorption layers being placed one-by-one on the stepped welding holder and around the bottom step for welding, and followed lastly by C-shaped rings of the piston-sealing layers being placed one-by-one on the stepped welding holder and around a top step of the stepped welding holder for welding.

* * * * *